Oct. 12, 1948.　　　　　H. C. MITTENDORF　　　　　2,451,296
ELECTRIC HOT WATER HEATER
Filed Jan. 3, 1947　　　　　　　　　　　　　　　　　2 Sheets-Sheet 2

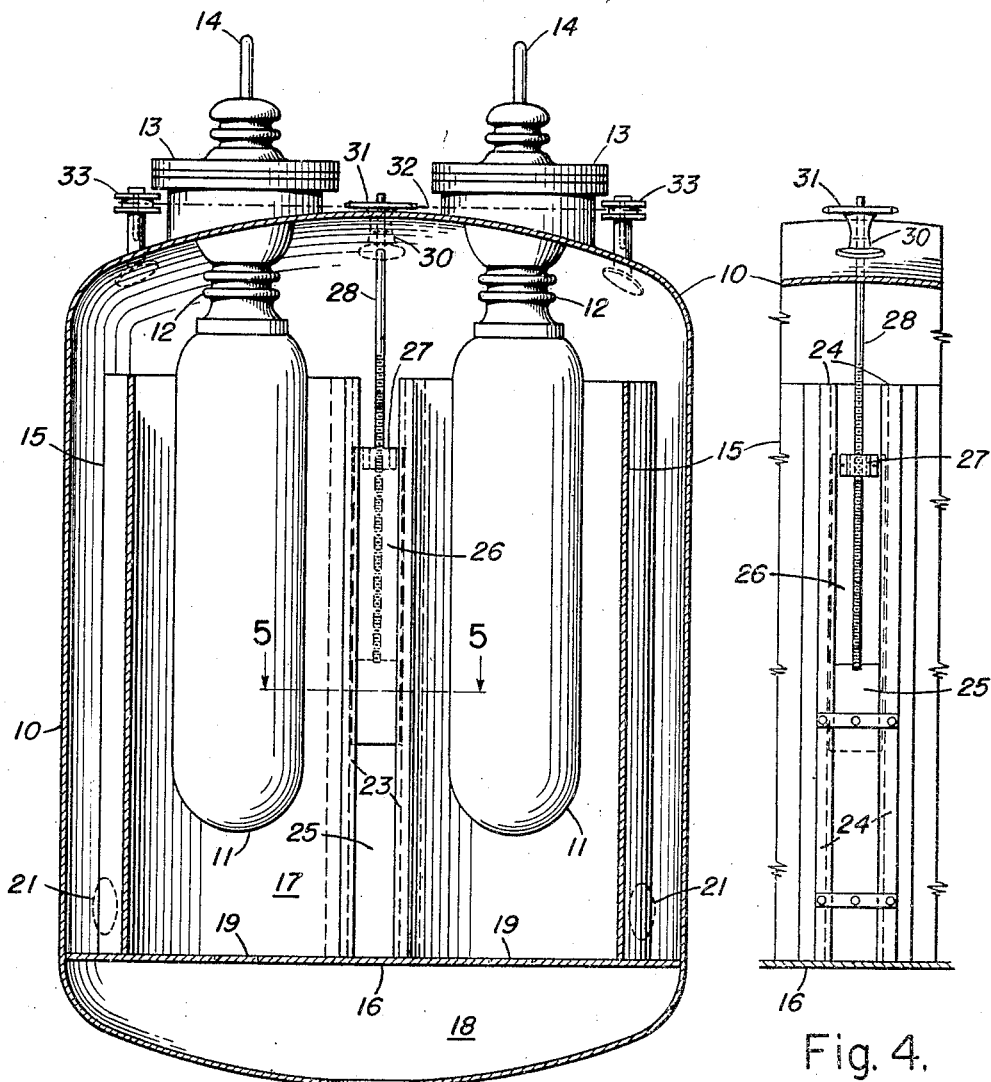
Fig. 1.
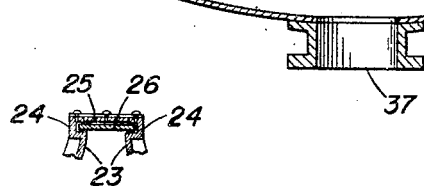
Fig. 5.
Fig. 4.
INVENTOR.
Harvey C. Mittendorf

INVENTOR.
Harvey C. Mittendorf
BY *Kurt Lounsfeld*

Patented Oct. 12, 1948

2,451,296

UNITED STATES PATENT OFFICE 2,451,296

ELECTRIC HOT-WATER HEATER

Harvey C. Mittendorf, East Orange, N. J., assignor to Combustion Engineering Company, Inc., New York, N. Y., a corporation of Delaware Application January 3, 1947, Serial No. 720,115

6 Claims. (Cl. 219—40)

This invention relates to the heating of fluid by electrical power and it has special reference to electric hot water heaters of the fluid-immersed electrode type.

In electric boilers of large capacity the electrodes are suspended within a drum by insulators in the top head of the drum and water is evaporated by the heat generated by the current flow between electrodes. These electrodes are partially immersed in the liquid to be heated and depending upon conditions such as the amount of water passing through the boiler may be caused to only heat the water and not to generate steam. For a fixed amount of water flowing through the boiler, the immersion of the electrodes in the water must be varied to suit any change of energy input. In large units the electrodes may weigh from 500 to 2000 pounds or more. With their supporting structure in a three phase design they may weigh as much as 5 tons. To avoid possible insulator breakage it is desirable that they be mounted in a fixed position so that the expedient of moving them vertically in order to vary the amount of immersion is impractical.

A further objection to moving the electrodes is found in that the clearances between electrodes and the neutral plate may be small and any sway while changing the immersion of the electrodes would produce unequal current distribution and a short circuit if one of the electrodes and the neutral plate touched each other. Consequently variations of immersion to increase or decrease the electric energy input should preferably be obtained by varying the water level and not by varying the electrode elevation. The hottest water, moreover, will be near the water surface and for satisfactory operation as a water heater this hot surface water must be skimmed off and replaced by the cooler water from below. Furthermore, the water should be churned as it is skimmed off so as to equalize the temperature of the entire amount removed.

It is an object of this invention to provide novel means for controlling the temperature of the hot water from an electric water heater with varying rates of flow and/or varying temperatures of feed water.

Other objects and advantages will become apparent as the description hereof proceeds.

One preferred form of the invention is shown by the accompanying drawings wherein:

Figure 1 is a transverse section in elevation, taken on line 1—1 of Figure 2, of an electric hot water heater embodying my inventive improvements;

Figure 4 is a fragmentary elevation taken on line 4—4 of Figure 2 to show how those openings are adjusted as to effective discharge elevation;

Figure 5 is a section on line 5—5 of Figure 1 through the vertically movable gate by which such adjustment is effected.

Figure 2:
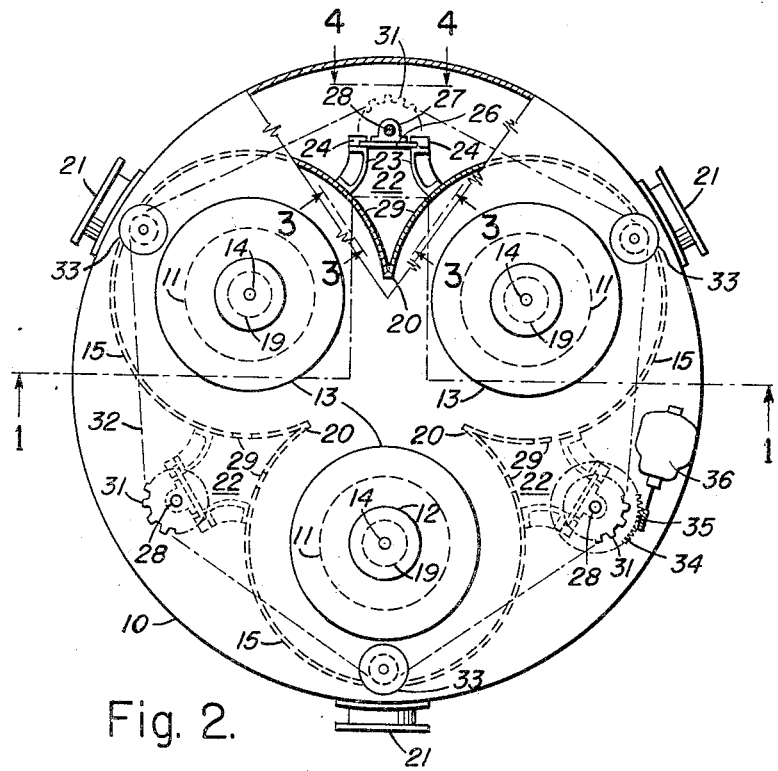
Figure 2 is a plan view of the Figure 1 heater having a fragment of the top drum head removed to show internal parts.

In these drawing views there is disclosed a three-phase hot water heater comprising a drum 10 in which three electrodes 11 are suspended from insulators 12 which in turn are mounted in flanges 13 supported by the drum's top head. The three-phase source of heating current (not shown) is connected to the three electrode terminals 14.

Surrounding the electrodes 11 is the usual "clover leaf" neutral structure which comprises upright metal plates 15 mounted concentrically around the electrodes 11 and extending from just below the electrode tops to well below the electrode bottoms as best indicated by Figure 1. The lower edges of these upright plates 15 join (in liquid-tight relation) with a partition 16 (shown horizontal) which separates the drum into two compartments 17 and 18, one above the partition and one therebelow. In the illustrative arrangement shown this disc-like partition 16 is provided with three holes 19, one directly beneath each of the electrodes 11, through which water may flow between the lower and upper compartments 17 and 18.

Each upright plate 15 of the clover leaf structure is further fastened (again in liquid-tight relation) to the adjacent plate along their meeting edges 20 as best indicated by Figure 2. In this manner the upper compartment 17 of drum 10 is divided into two further compartments, one inside and one outside of the clover leaf. Three outlets 21 are shown as being provided in the drum's outer wall just above the level of the partition 16 for the purpose of discharging heated water from the outer portion of upper compartment 17.

Figure 3:
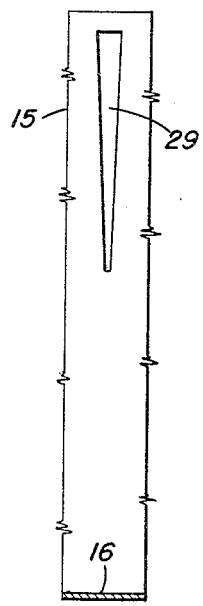
Figure 3 is a fragmentary elevation taken on line 3—3 of Figure 2 to show how the clover-leaf neutral plate around the electrodes is provided with water-escape openings.

Referring next to Fig. 2 at the portion where a fragment of drum head has been removed adjacent each junction 20 of the upright clover leaf plates 15 there is provided an overflow box or chamber 22 comprising the represented sides 23, the grooved members 24 secured to the side member faces, and a cover plate 25 intermediate member 24 closing the lower portion of box 22 as indicated in Figures 1, 2, 4, and 5. The vertical grooves in the inner edges of members 24 continue downwardly past the outer cover plate 25 to the lower partition 16. Within said grooves is mounted a vertically-movable gate 26 provided with a threaded extension 27 which cooperates with a threaded gate rod 28 extending upwardly through the top of the drum head 10. Through each of the clover leaf plates 15 and adjacent their meeting at juncture 20 there is provided an opening 29, preferably wedge-shaped, as shown in Figure 3, through which water from within the clover leaf structure may flow into the overflow chamber 22.

As already indicated, there are three chambers 22 within the drum, one adjacent the meeting edges 20 of each joined set of plates 15 of the clover leaf and all being of the same construction as the one heretofore shown and described. The three associated gate rods 28 all extend through the top of the drum where each is mounted in a stepped bearing 30 which prevents vertical rod movement but permits rod rotation. These bearings may, if desired be supplemented by glanding (not shown) to provide pressure-tight seals. The top of each gate rod 28 is provided with a sprocket wheel 31 and a continuous sprocket chain 32 passes over these sprocket wheels 31 and intermediate idlers 33 as is best represented in Figure 2. In the illustrative arrangement shown, one of these gate rods 28 is further provided with a worm wheel 34 that meshes with a worm 35 driven by a reversing motor 36. In this manner the chain 32 may be driven to rotate in a clockwise or counter-clockwise direction thereby raising or lowering all of the gates 26.

As the gates 26 are lowered, water will flow over their top edges and the water within the clover leaf will flow through the triangular slots 29 thence into chambers 22 and over gates 26. Thus by lowering all of the gates simultaneously the hot water may be drawn off substantially uniformly from within the clover leaf surrounding each electrode. In this manner the level of the water immersing the electrodes 11 within the clover leaf may be uniformly lowered or raised as desired.

In operation of my improved heater, water is fed into the bottom of lower chamber 18 through inlet 37. This incoming water flows upwardly through the three openings 19 in partition 16 into the space 17 within the clover leaf 15. Openings 19 being of equal size and being located directly beneath the three electrodes 11 cause a substantially uniform distribution of the incoming water to each of the electrodes. As the water within the clover leaf progresses upwardly it is heated by electric current flowing therethrough from electrodes 11 to neutral 15 and between electrodes, and this hot water flows through slots 29 into chambers 22 and thence into the space between the clover leaf 15 and the drum 10. From thence the water flows through the drum outlets 21 (three illustratively shown) to the point of use.

Figure 6:
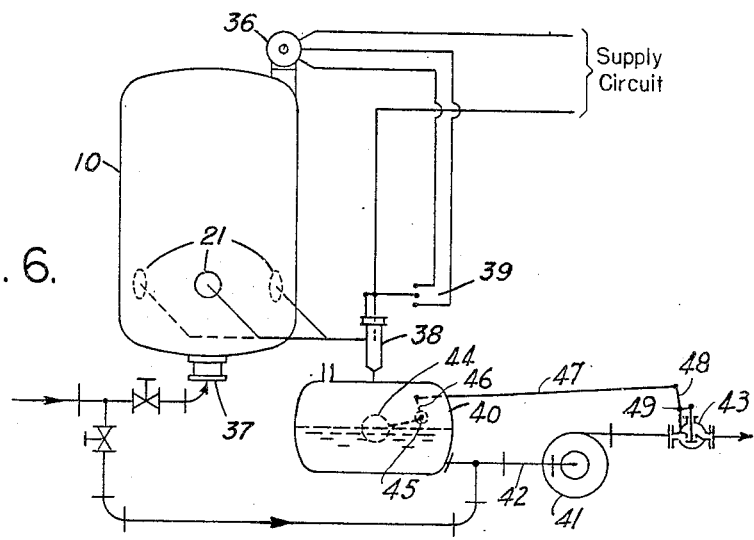
Figure 6 is a diagram of control means suitable for use with the improved electric hot water heater here illustrated.

This improved heater readily lends itself to automatic control of water temperature. Referring to Figure 6 a thermostat 38 responsive to the temperature of the discharged hot water is located in the common discharge pipe (fed by outlets 21) to actuate a double switch 39 which controls the forward and reverse rotation of gate-positioning motor 36. When the water becomes cold the thermostat causes the motor to rotate in a direction to raise the gates 26 and when hot, the thermostat causes the motor to rotate to lower the gates 26. In consequence the water flowing through the electric heater contacts more or less surface of the electrodes 11 and correspondingly receives more or less heat from the electrical power circuit.

Because the water flow usually will be greater when more electric energy is to be expended the slots 29 in the clover leaf 15 are preferably tapered as shown in Figure 3. In this manner the water level in the clover leaf can be maintained more nearly at the same level adjacent all electrodes since substantially the same head above each weir (comprising slot 29 and gate top 26) will prevail whether the quantity of water flowing through the heater 10 is high or low. This adds to the stability of operation. As, moreover, the water cascades over the tops of gates 26, it is churned and its temperature equalized with any cooler water which may leak through the grooves between each gate 26 and the gate frame 23—24.

As further shown by Figure 6, a water flow control may be connected to the heater discharge conduits 21, 38 to prevent possible flooding of the heater should the rate of delivery of cold water to the heater exceed the rate at which the heated water is withdrawn. Such a control may comprise a tank 40 vented to the atmosphere which is connected to the heater discharge conduits 21, 38 and receives all of the heated water. A pump 41 withdraws the water from the tank 40 through pipe 42 and discharges it to the point of use through a throttle valve 43. A float 44 is mounted in the tank 40 and has its shaft 45 extending through the shell of the tank. Vertical movement of the float is transmitted through its shaft 45 to crank 46, thence to connecting rod 47, through bell crank 48 (fulcrumed at 49) and to the valve stem and valve disc of valve 43.

As the water level in tank 40 and float 44 rises, due to an excess rate of discharge of water from the heater over the rate of delivery by pump 41, valve 43 opens proportionately and thereby proportionately increases the water delivery of pump 41. The reverse response occurs when the water level in tank 40 falls.

While I have shown my improvements as applied to an electric water heater having three electrodes for three-phase current supply it will be obvious that such showing is illustrative rather than restrictive and that the invention may also be applied to water heaters having a different number of electrodes for a different number of phases.

Since, moreover, only the preferred embodiment of my invention has been shown and described, it will be understood that changes in construction, combination and arrangement of parts may be made without departing from the spirit and scope of the invention as claimed.

What I claim is:

1. In an electric heater, the combination of an enclosure having in the lower portion thereof an inlet for admitting liquid and further having in communication with a side portion thereof a vertically-extending passage through which liquid may flow out of the enclosure, a vertically extending electrode within said enclosure for passing through said liquid therein heating current which varies with the liquid level around the electrode, a gate for said outlet passage covering the lower portion thereof and being adjustable also to cover progressively higher portions, and means for adjusting said gate up or down whereby to select the effective level from which said liquid drains from said enclosure and thereby control the temperature to which that liquid is heated by current from said electrode.

2. In an electric heater, the combination of an enclosure having in the lower portion thereof an inlet for admitting liquid and in an upper side portion thereof a vertically-elongated opening through which liquid may flow out of the enclosure, a vertically extending electrode within said enclosure for passing through said liquid therein heating current which varies in amount with the liquid level around the electrode, a chamber on the side of said enclosure communicating with said outflow opening to receive all liquid leaving the enclosure and having its own vertically-extending discharge opening, a gate for said discharge opening covering the lower portion thereof and being adjustable also to cover progressively higher portions, and means for adjusting said gate up or down whereby to select the effective level from which said liquid drains from said enclosure and thereby control the temperature to which that liquid is heated by current from said electrode.

3. In an electric heater, the combination of an enclosure having in the lower portion thereof an inlet for admitting liquid and further having in communication with a side portion thereof a vertically-extending passage through which liquid may flow out of the enclosure, a vertically extending electrode within said enclosure for passing through said liquid therein heating current which varies with the liquid level around the electrode, a gate for said outlet passage covering the lower portion thereof and being adjustable also to cover progressively higher portions whereby to select the effective level from which said liquid drains from said enclosure, and means responsive to the temperature of the heated liquid flowing from said outlet passage for adjusting said gate up or down whereby to keep within predetermined limits the temperature to which the liquid within said enclosure is heated by current from said electrode.

4. In an electric water heater, the combination of a drum, vertically extending electrodes suspended within the drum, a vertically extending plate structure concentrically spaced from the electrodes and also spaced from the drum, a partition below the electrodes sealed to the drum dividing the drum into separate top and bottom compartments, said partition having a water-admitting opening below each electrode, sealing means at the juncture of the plate structure and baffle dividing the top compartment into separate inner and outer spaces separated by said structure, said plate structure having vertically extending slots substantially uniformly disposed in its side around the electrodes, vertically adjustable gate means associated with said slots to controllably drain off into said outer space the hottest water from selectable levels within the plate structure, a water inlet into the bottom compartment and a water offtake from the drum shell at the bottom of said outer space in the top compartment.

5. In an electric heater for liquids, the combination of a drum, vertically extending electrodes suspended within the drum, a vertically extending plate structure concentrically spaced from the electrodes and also spaced from the drum, a partition below the electrodes sealed to the drum dividing the drum into separate top and bottom compartments, said partition having a liquid-admitting opening below each electrode, sealing means at the juncture of the plate structure and baffle dividing the top compartment into separate inner and outer spaces separated by said structure, downwardly contracting slots in said plate structure substantially uniformly disposed around the electrodes, vertically adjustable gate means associated with said slots to controllably drain off into said outer space the hottest liquid from selective levels within the plate structure, a liquid inlet into the bottom compartment and a liquid offtake from the drum shell at the bottom of said outer space in the top compartment.

6. In an electric water heater, the combination of a drum, vertically extending electrodes suspended within the drum, a vertically extending plate structure concentrically spaced from the electrodes and also spaced from the drum, a partition below the electrodes sealed to the drum dividing the drum into separate top and bottom compartments, said partition having a water-admitting opening below each electrode, sealing means at the juncture of the plate structure and baffle dividing the top compartment into separate inner and outer spaces separated by said structure, downwardly contracting slots in said plate structure substantially uniformly disposed around the electrodes, means forming chambers mounted on the outside of said plate structure adjacent to and including the slots, one side of each of said chambers being provided with an opening extending at least to the bottom of said slots, a vertically adjustable gate associated with each of said chamber openings, means for simultaneously and equally moving said gates up or down along the openings to controllably drain off into said outer space the hottest water from selectable levels around said electrodes within the plate structure, a water inlet into the bottom compartment and a water offtake from the drum shell at the bottom of said outer space in the top compartment.

HARVEY C. MITTENDORF.

REFERENCES CITED

The following references are of record in the file of this patent:

UNITED STATES PATENTS

| Number | Name | Date |
| --- | --- | --- |
| 1,337,120 | Cutler | Apr. 13, 1920 |
| 1,527,762 | Unland | Feb. 24, 1925 |
| 1,550,224 | Otis et al. | Aug. 18, 1925 |